US012810189B2

(12) United States Patent
Oh et al.

(10) Patent No.: US 12,810,189 B2
(45) Date of Patent: Nov. 24, 2026

(54) LOGICAL QUBIT ARRANGEMENT ARCHITECTURE BASED ON CHECKERBOARD AND METHOD OF MOVING MAGIC QUBIT THEREOF

(71) Applicant: Electronics and Telecommunications Research Institute, Daejeon (KR)

(72) Inventors: SooCheol Oh, Daejeon (KR); Youngchul Kim, Daejeon (KR); Sang Min Lee, Daejeon (KR); Gyuil Cha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 567 days.

(21) Appl. No.: 18/528,044

(22) Filed: Dec. 4, 2023

(65) Prior Publication Data

US 2024/0193453 A1 Jun. 13, 2024

(30) Foreign Application Priority Data

Dec. 9, 2022 (KR) ........................ 10-2022-0171300
Mar. 6, 2023 (KR) ........................ 10-2023-0028995

(51) Int. Cl.

| | |
|---|---|
| ***G06N 10/40*** | (2022.01) |
| ***G06N 10/00*** | (2022.01) |
| ***G06N 10/20*** | (2022.01) |
| ***G06N 10/70*** | (2022.01) |

(52) U.S. Cl.

CPC ............ *G06N 10/40* (2022.01); *G06N 10/20* (2022.01); *G06N 10/70* (2022.01)

(58) Field of Classification Search

None

See application file for complete search history.

(56) References Cited

U.S. PATENT DOCUMENTS

| | | | |
|---|---|---|---|
| 11,010,518 | B2 | 5/2021 | Itoko et al. |
| 11,194,659 | B2 | 12/2021 | Versluis et al. |
| 11,405,056 | B2 | 8/2022 | Hastings et al. |
| 11,533,171 | B2 | 12/2022 | Hong et al. |
| 2019/0244128 | A1 | 8/2019 | Choi et al. |
| 2020/0311593 | A1 | 10/2020 | Gidney et al. |

OTHER PUBLICATIONS

Jin et al., “Multilayered logical qubits and synthesized quantum bits”, Quantum Science and Technology, vol. 8, No. 035008, May 3, 2023, pp. 1-20 (21 p. total), https://doi.org/10.1088/2058-9565/accec5.

*Primary Examiner* — Leigh M Garbowski
(74) *Attorney, Agent, or Firm* — Sughrue Mion, PLLC

(57) ABSTRACT

A method of moving a magic qubit in logical qubit arrangement architecture based on a checkerboard may include generating a plurality of distilled magic qubits necessary for a predetermined logic operation through a magic state distiller, storing the plurality of distilled magic qubits in a magic qubit repository, primarily moving the stored magic qubit to an area adjacent to a logical qubit block corresponding to a destination through an external bus and an internal bus, and secondarily moving the magic qubit from the area adjacent to the logical qubit block to the destination within the logical qubit block through a temporary bus.

17 Claims, 19 Drawing Sheets

LOGICAL QUBIT ARRANGEMENT ARCHITECTURE BASED ON CHECKERBOARD AND METHOD OF MOVING MAGIC QUBIT THEREOF

CROSS-REFERENCE TO RELATED APPLICATION

This application claims priority to and the benefit of Korean Patent Application No. 10-2022-0171300, filed on Dec. 9, 2022 and Korean Patent Application No. 10-2023-0028995, filed on Mar. 6, 2023, the disclosure of which is incorporated herein by reference in its entirety.

BACKGROUND

1. Technical Field

The present disclosure relates to logical qubit arrangement architecture based on a checkerboard and a method of moving a magic qubit thereof and to logical qubit arrangement architecture using a temporary bus in order to perform a general-purpose logic quantum operation and a method of moving a magic qubit.

2. Related Art

A quantum computer is a computer for processing data by using quantum mechanical phenomena, such as entanglement or an overlap. The quantum computer is considered as a next-generation computer which may replace the semiconductor computer. However, research of a technology associated with the quantum computer does not come up to an implementation of the quantum computer.

The quantum computer is actively researched by various companies. A recent quantum computer is in an initial development stage having a level in which a qubit having about 50 information errors is supported, and has not yet been commercialized.

The quantum computer generates a logical qubit based on a surface code in order to modify an error of a physical qubit, and requires dedicated logical qubit architecture in order to perform a general-purpose quantum circuit on a logical qubit.

SUMMARY

Various embodiments are directed to providing logical qubit arrangement architecture based on a checkerboard which executes a general-purpose quantum circuit and also supports a movement of a magic qubit for a predetermined logic operation, and a method of moving a magic qubit thereof.

However, objects of the present disclosure to be achieved are not limited to the aforementioned object, and other objects may be present.

A method of moving a magic qubit in logical qubit arrangement architecture based on a checkerboard according to a first aspect of the present disclosure may include generating a plurality of distilled magic qubits necessary for a predetermined logic operation through a magic state distiller, storing the plurality of distilled magic qubits in a magic qubit repository, primarily moving the stored magic qubit to an area adjacent to a logical qubit block corresponding to a destination through an external bus and an internal bus, and secondarily moving the magic qubit from the area adjacent to the logical qubit block to the destination within the logical qubit block through a temporary bus.

Furthermore, logical qubit arrangement architecture based on a checkerboard according to a second aspect of the present disclosure may include a magic state distiller configured to generate a plurality of distilled magic qubits necessary for a predetermined logic operation, a magic qubit repository configured to store the plurality of distilled magic qubits, and a bus unit including an external bus for moving a magic qubit stored in the magic qubit repository, an internal bus for moving the magic qubit from the external bus to an area adjacent to a logical qubit block, and a temporary bus for moving the magic qubit from the internal bus to an inside of the logical qubit block.

A computer program according to another aspect of the present disclosure is combined with a computer, that is, hardware, executes the method of moving a magic qubit in logical qubit arrangement architecture based on a checkerboard, and is stored in a computer-readable recording medium.

Other details of the present disclosure are included in the detailed description and the drawings.

The embodiments of the present disclosure can use fewer logical qubits because the embodiments are basically based on the checkerboard and provide a rapid movement of a magic qubit by additionally using the temporary bus.

Furthermore, the embodiments of the present disclosure can minimize resource consumption for a logical qubit by generating the temporary bus only when a movement of a magic qubit is required and deleting the temporary bus after the movement of the magic qubit is completed.

Effects of the present disclosure which may be obtained in the present disclosure not limited to the aforementioned effects, and other effects not described above may be evidently understood by a person having ordinary knowledge in the art to which the present disclosure pertains from the following description.

DETAILED DESCRIPTION

Figure 1:
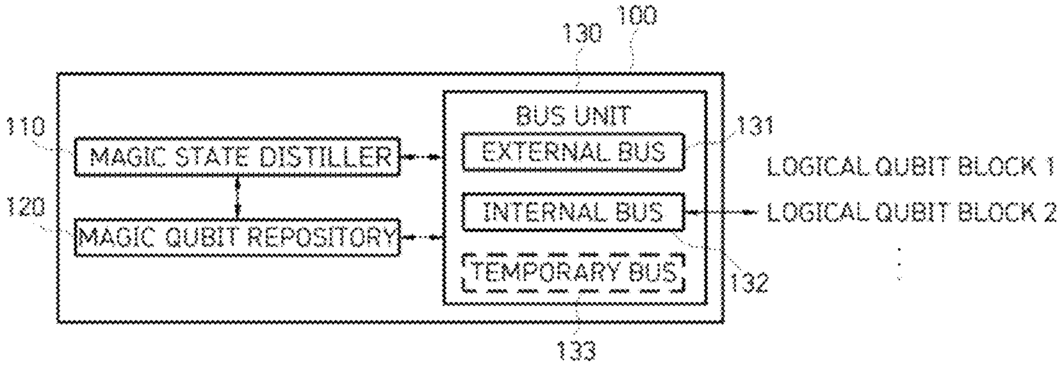
FIG. 1 is a block diagram of logical qubit arrangement architecture according to an embodiment of the present disclosure.

The present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element.

Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, in order to help understanding of those skilled in the art, a proposed background of the present disclosure is first described and an embodiment of the present disclosure is then described.

In order to perform a general-purpose quantum circuit for a logical qubit, the arrangement of logical qubits is required. In relation to the arrangement, the existing checkerboard-based logical qubit arrangement has an advantage in that fewer logical qubits are used.

During a general-purpose logic quantum operation, a logic S operation and a logic T operation require a data logical qubit and a distilled magic qubit. A magic state distiller is operated separately from the execution of a general-purpose quantum operation because the magic state distiller generates a distilled magic qubit having a low error rate and uses multiple logical qubits. Accordingly, it is necessary to move the distilled magic qubit, that is, the output of the magic state distiller, to the inside of logical qubit arrangement architecture for executing the general-purpose quantum operation.

In this case, a move command on a checkerboard allows only a movement between neighbor qubits. Accordingly, in order for a magic qubit outside the checkerboard to move to a logical qubit within the checkerboard, many consecutive move commands are required.

Accordingly, there are problems in that a lot of time is required and the existing logic quantum operation being executed needs to be stopped.

In order to solve such problems, logical qubit arrangement architecture based on a checkerboard and a method of moving a magic qubit thereof according to embodiments of the present disclosure can execute a general-purpose quantum circuit and also support a movement of a magic qubit for a predetermined logic operation. In particular, an embodiment of the present disclosure can use fewer logical qubits because the embodiment is basically based on a checkerboard, and can support a rapid movement of a magic qubit additionally based on a temporary bus structure.

Hereinafter, logical qubit arrangement architecture and a method of moving a magic qubit thereof according to embodiments of the present disclosure are described with reference to FIGS. 1 to 11A and 11B.

Figure 2:
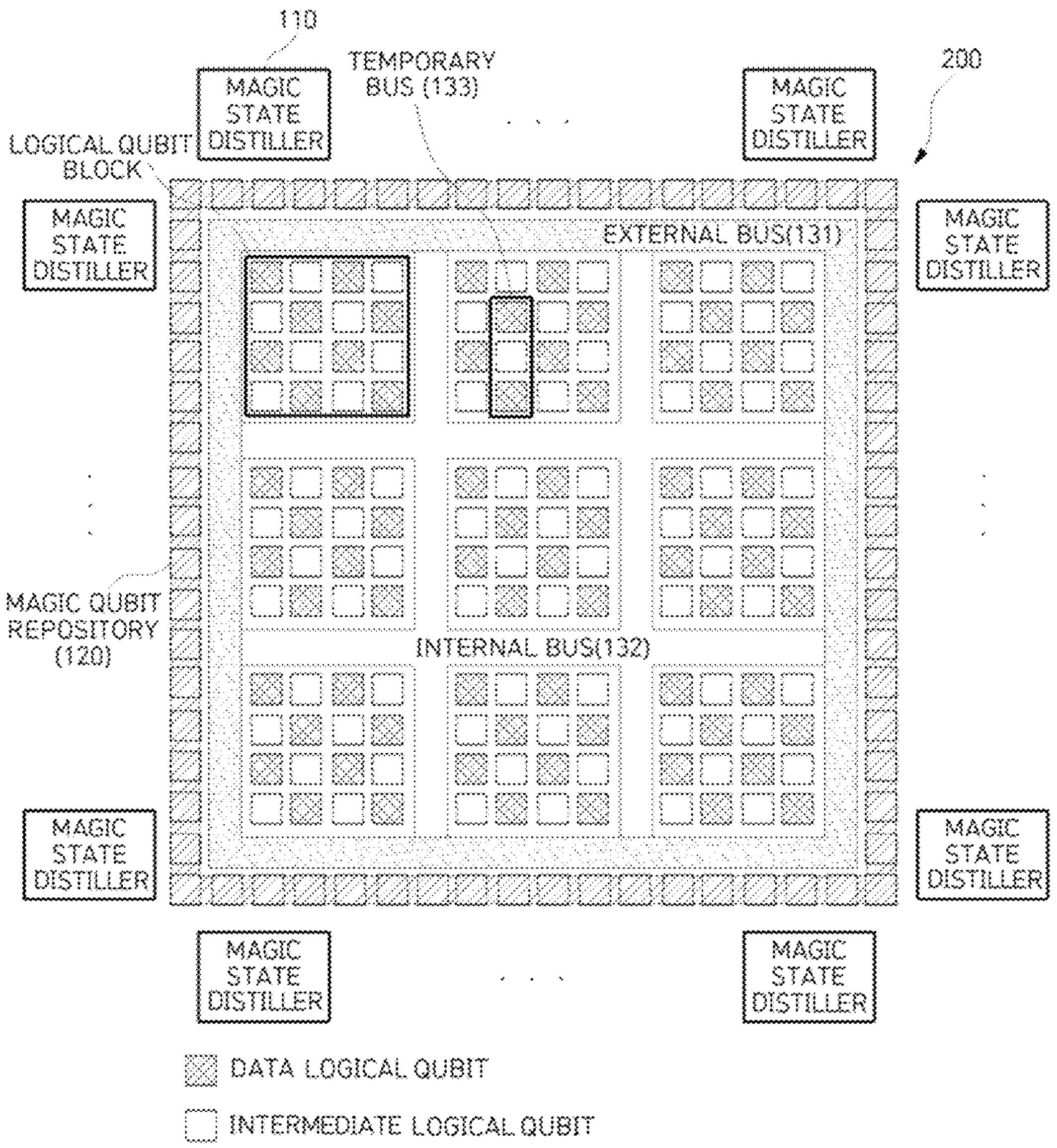
FIG. 2 is a diagram for describing an example of the detailed arrangement of the logical qubit arrangement architecture according embodiment of the present disclosure.

FIG. 1 is a block diagram of logical qubit arrangement architecture 100 according to an embodiment of the present disclosure. FIG. 2 is a diagram for describing an example 200 of the detailed arrangement of the logical qubit arrangement architecture according to an embodiment of the present disclosure. An embodiment of the present disclosure may be performed by a quantum computing system including a predetermined compiler, but the present disclosure is not essentially limited thereto.

The logical qubit arrangement architecture 100 according to an embodiment of the present disclosure includes a magic state distiller 110, a magic qubit repository 120, and a bus unit 130.

The magic state distiller 110 generates a distilled magic qubit necessary for a predetermined logic operation. In this case, the predetermined logic operation may be at least one of a logic S operation and a logic T operation.

The magic qubit repository 120 stores a plurality of distilled magic qubits. In this case, the magic qubit repository 120 may be disposed in the outskirts of an external bus 131.

The bus unit 130 includes an external bus 131, an internal bus 132, and a temporary bus 133.

The external bus 131 moves, to the internal bus 132, a magic qubit stored in the magic qubit repository 120.

The internal bus 132 moves a magic qubit from the external bus 131 to an area adjacent to a logical qubit block. Furthermore, the internal bus 132 is used to perform a logical qubit operation. All logical qubits are split into logical qubit blocks each having a predetermined size. The plurality of split logical qubit blocks are connected through the internal bus 132.

The temporary bus 133 moves a magic qubit from the internal bus 132 to the inside of a logical qubit block. The temporary bus 133 may be temporarily generated for a movement of a magic qubit to the inside of a logical qubit block, and may be deleted when the movement of the magic qubit is completed.

In the description of the present disclosure, each logical qubit has two types of boundaries. In this case, a solid line indicates a boundary X, and a dotted line indicates a boundary Z. Logical qubits may be adjacent to each other while facing each other at the same boundary (between the boundaries X or the boundaries Z). Various arrangements of logical qubits, which satisfy such a condition, are possible.

Furthermore, in descriptions given with reference to FIG. 2 and drawings subsequent to FIG. 2, the structure 200 in which logical qubits in each of which an upper and lower portion is the boundary X and a left and right portion is the boundary Z have been arranged in transverse and longitudinal directions has been described, but this is only an example. Various arrangement structures, such as an embodiment in which a left and right portion of a logical qubit is the boundary X and an upper and lower portion of the logical qubit is the boundary Z, an embodiment in a diagonal direction in which a top right or bottom left portion of a logical qubit is the boundary X and a top left or bottom right portion of the logical qubit is the boundary Z, or an embodiment in a diagonal direction in which a top left or bottom right portion of a logical qubit is the boundary X and a top right or bottom left portion of the logical qubit is the boundary Z, may be applied to the present disclosure.

Figure 3:
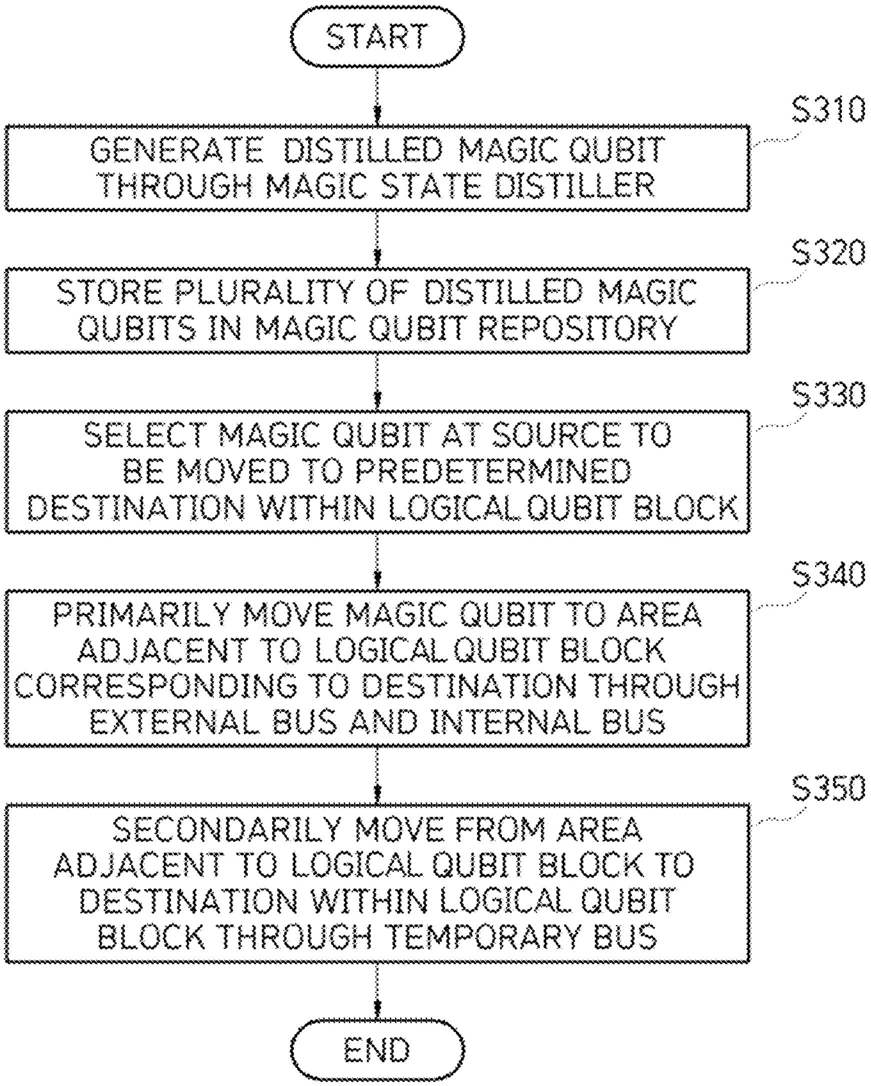
FIG. 3 is a flowchart of a method of moving a magic qubit in the logical qubit arrangement architecture based on a checkerboard according to an embodiment of the present disclosure.

FIG. 3 is a flowchart of a method of moving a magic qubit in the logical qubit arrangement architecture based on a checkerboard according to an embodiment of the present disclosure.

In the method of moving a magic qubit according to an embodiment of the present disclosure, first, a distilled magic qubit necessary for a predetermined logic operation is generated (S310) through the magic state distiller 110. The plurality of distilled magic qubits is stored in the magic qubit repository 120 (S320).

Next, a magic qubit at a source, which belongs magic qubits stored in the magic qubit repository 120 and which will be moved to a predetermined destination within a logical qubit block, is selected (S330).

When the destination to which the magic qubit will be moved on the logical qubit block is determined, the source in which the magic qubit has been stored, which will be used for the corresponding movement, needs to be selected. In this case, according to an embodiment of the present disclosure, a magic qubit having the shortest distance from the destination, among multiple magic qubits stored in the magic qubit repository 120, may be selected as the source. That is, assuming that the coordinates of a source, that is, a magic qubit, are (X1, Y1) and the coordinates of a destination, that is, a logical qubit, are (X2, Y2), a magic qubit the value of $|X1-X2|+|Y1-Y2|$ of which is the smallest may be selected as the source.

In this case, if the magic qubit repository 120 corresponding to the magic qubit selected as the source is disposed on the left or right of a logical qubit block corresponding to the destination, the magic qubit may be transversely moved.

Furthermore, if the magic qubit repository 120 corresponding to the magic qubit selected as the source is disposed on the upper or lower side of the logical qubit block corresponding to the destination, the magic qubit may be longitudinally moved.

Next, the stored magic qubit is primarily moved to an area adjacent to a logical qubit block corresponding to the destination (S340) through the external bus 131 and the internal bus 132, and is secondarily moved from the area adjacent to the logical qubit block to the destination within the logical qubit block through the temporary bus 133 (S350).

First, an embodiment of a transverse movement of a magic qubit is described with reference to FIGS. 4 and 5A to 5G.

Figure 4:
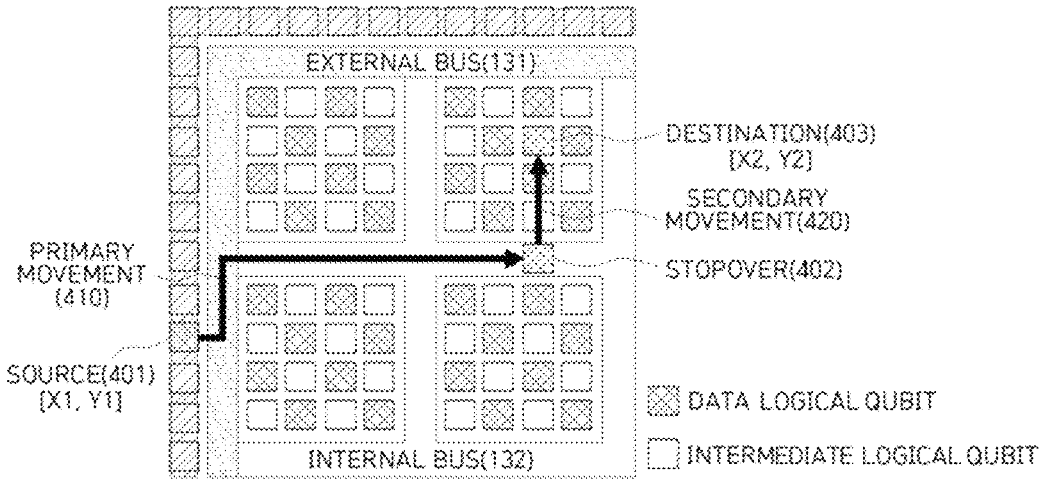
FIG. 4 is a diagram for describing a transverse movement of a magic qubit according to an embodiment of the present disclosure.
Figure 5A:
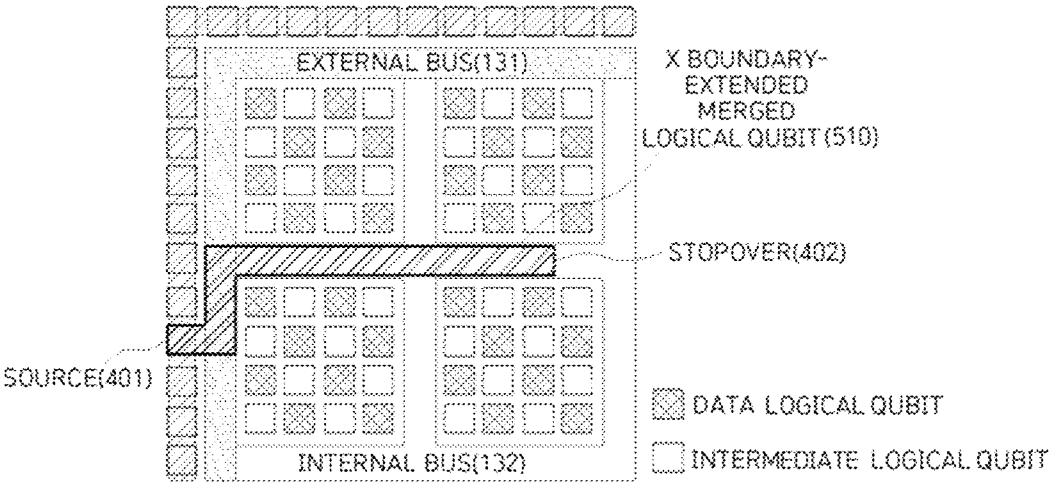
FIGS. 5A to 5G are diagrams for more specifically describing a transverse movement of a magic qubit according to an embodiment of the present disclosure.
Figure 5B:
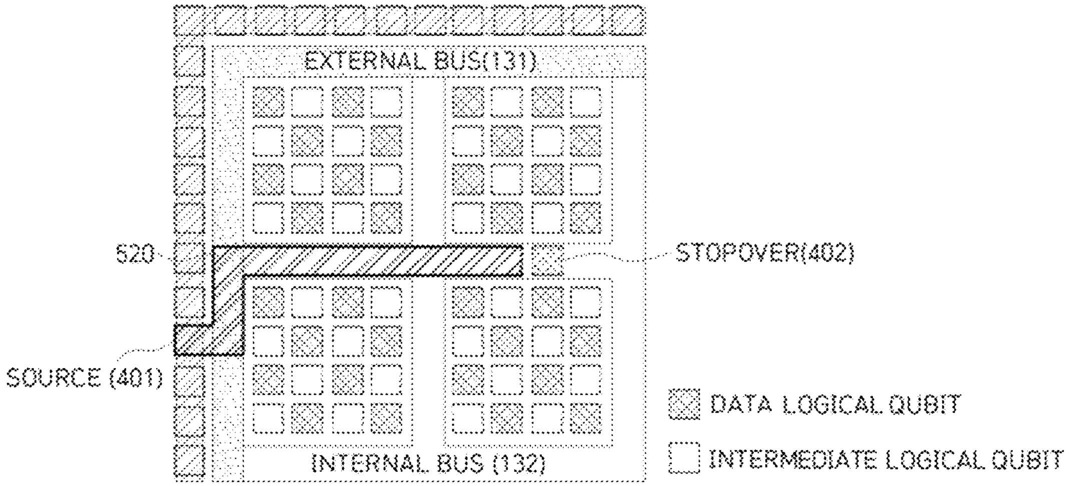

FIG. 4 is a diagram for describing a transverse movement of a magic qubit according to an embodiment of the present disclosure. FIGS. 5A to 5G are diagrams for more specifically describing a transverse movement of a magic qubit according to an embodiment of the present disclosure. In this case, FIGS. 5A and 5B illustrate a primary movement process, and FIGS. 5C to 5G illustrate a secondary movement process.

First, referring to FIG. 4, the internal bus 132 installed in the transverse direction and the temporary bus 133 installed in the longitudinal direction are used for the transverse movement of the magic qubit.

The transverse movement includes a primary movement 410 and a secondary movement 420. The primary movement 410 is to move a magic qubit at a source 401 to a stopover 402 in an area adjacent to a logical qubit block through the internal bus 132 in the transverse direction. In this case, the stopover 402 is disposed within the internal bus 132 adjacent to the upper or lower side of a logical qubit block to which a logical qubit at a destination 403 belongs.

Furthermore, the secondary movement 420 is to move the magic qubit at the stopover 402 to the destination 403 within the logical qubit block through the temporary bus 133 in the longitudinal direction.

More specifically, referring to FIG. 5A, a first X boundary-extended merged logical qubit 510, including the source 401, the stopover 402, and the external bus 131 and the internal bus 132 between the source 401 and the stopover 402, is generated. The first X boundary-extended merged logical qubit 510 has a form in which the boundary X of the magic qubit at the source 401 has extended up to the stopover 402 through the external bus 131 and the internal bus 132.

Such a process is performed by resetting qubits within the external bus 131 and the internal bus 132 between the source 401 and the stopover 402 and at the stopover 402 to $|0\rangle$ and performing error syndrome measurement on all of the first X boundary-extended merged logical qubits 510. In this case, the first X boundary-extended merged logical qubit 510 and the magic qubit at the source 401 have the same logical qubit state.

Referring to FIG. 5B, a logical qubit at the stopover 402 is split from the first X boundary-extended merged logical qubit 510 (520). Such a process is performed by measuring the remaining qubits except the logical qubit at the stopover 402 in the first X boundary-extended merged logical qubit 510 and X-correcting the value of the logical qubit at the stopover 402 based on the results of the measurement.

Figure 5C:
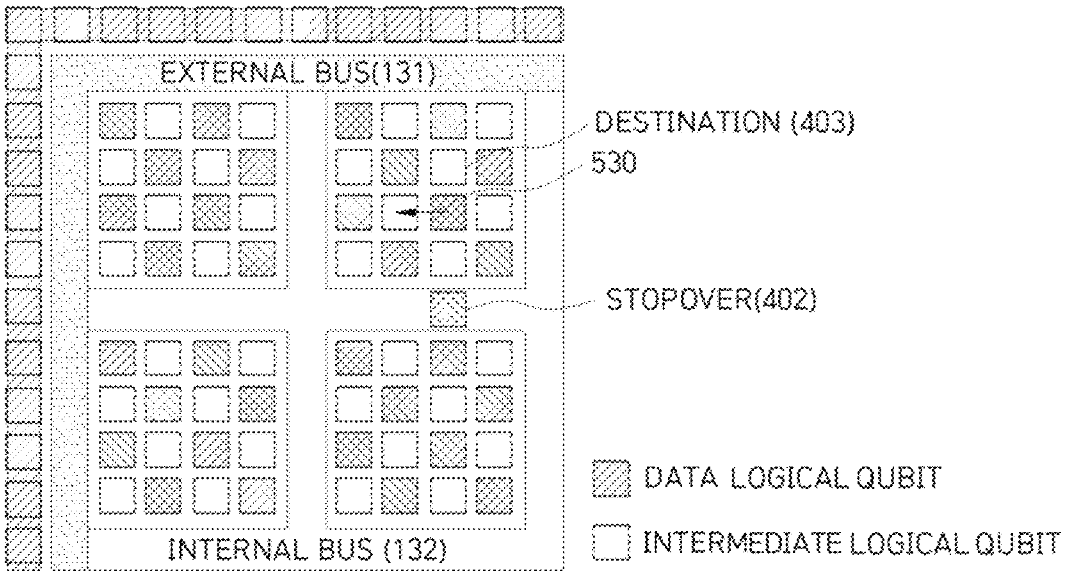

FIG. 5C is a process of generating the temporary bus 133. Data logical qubits between the stopover 402 and the destination 403 are moved to an adjacent intermediate logical qubit (530). Specifically, the process of generating the temporary bus 133 is performed by sequentially performing a process of performing boundary Z merge on an intermediate qubit adjacent to a data logical qubit and a process of splitting logical qubits that have been merged into the boundary Z again on the basis of the boundary Z.

Figure 5D:
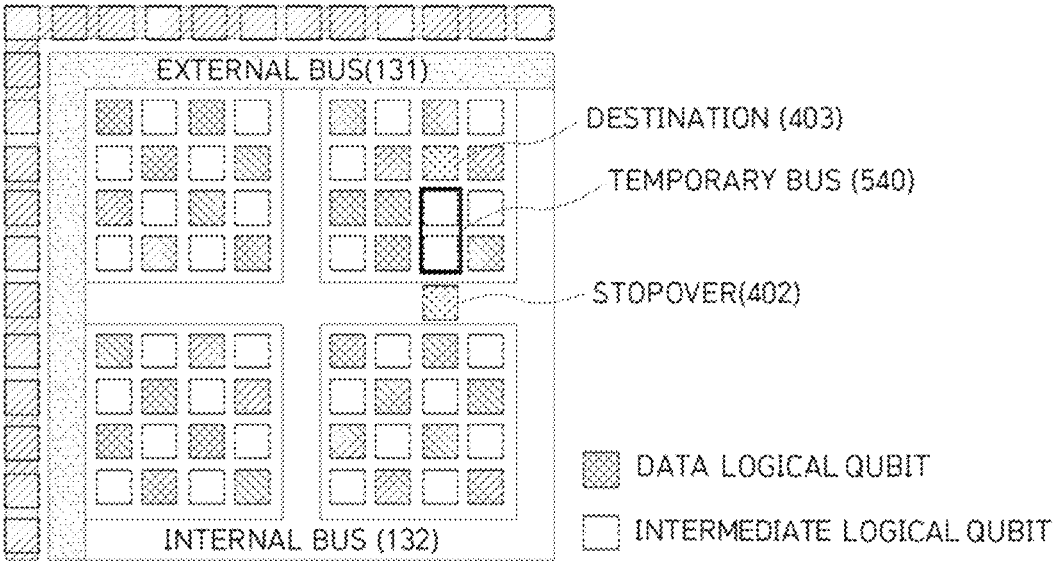

When the execution of the Z merge and split processes is completed, as illustrated in FIG. 5D, only intermediate logical qubits are present between the stopover 402 and the destination 403. A temporary bus 540 based on the intermediate logical qubits is generated.

Figure 5E:
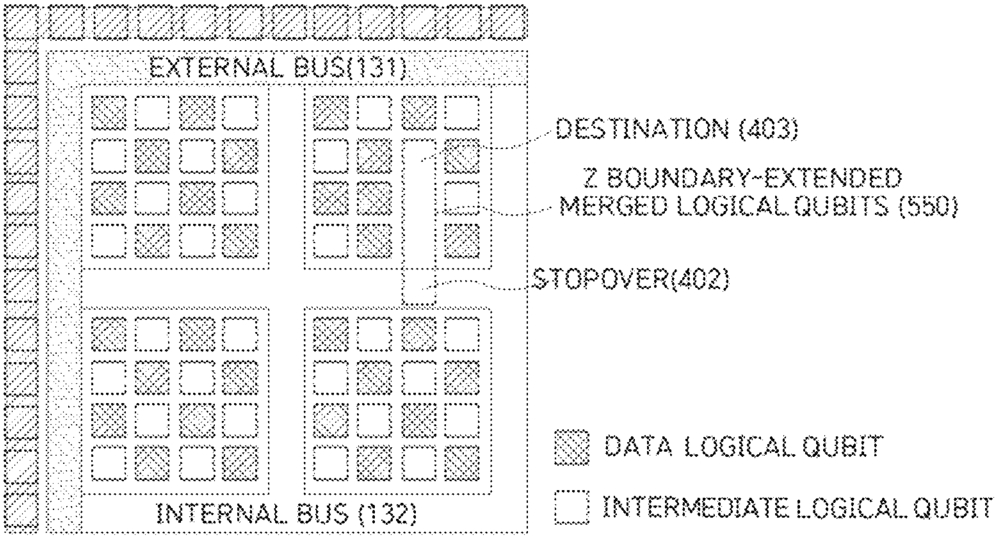

Referring to FIG. 5E, a second Z boundary-extended merged logical qubit 550, including the stopover 402, the destination 403, and the temporary bus 540 between the stopover 402 and the destination 403, is generated. The second Z boundary-extended merged logical qubit 550 has a form in which the boundary Z of the stopover has extended up to the destination through the temporary bus 540.

Such a process is performed by resetting qubits within the temporary bus 540 and at the destination 403 to |+> and performing error syndrome measurement on all of the second Z boundary-extended merged logical qubits 550. In this case, the second Z boundary-extended merged logical qubit 550 and magic qubits at the stopover 402 have the same logical qubit state.

Figure 5F:
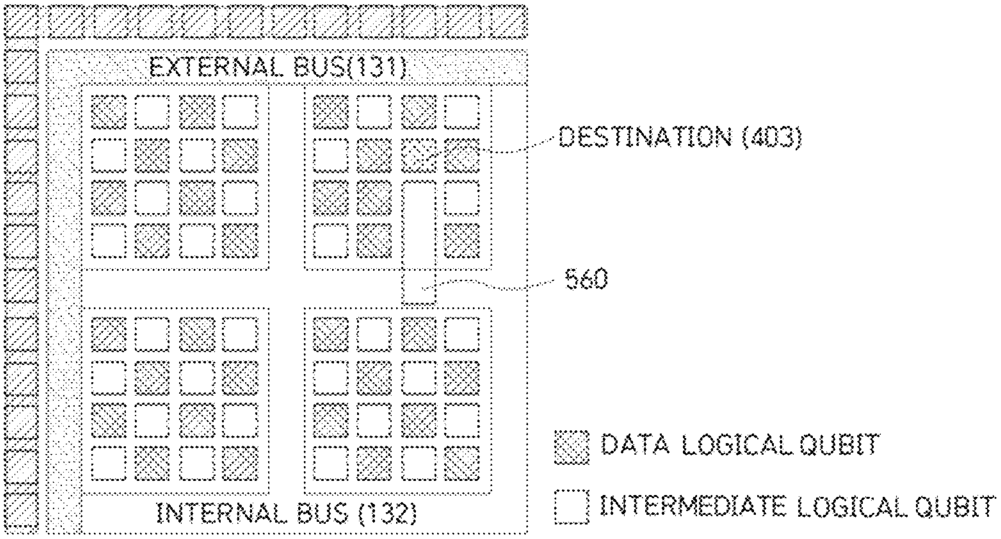

FIG. 5F is a process of splitting a logical qubit at the destination 403 from the second Z boundary-extended merged logical qubit 550 (560). Such a process is performed by measuring the remaining qubits except the logical qubit at the destination 403 in the second Z boundary-extended merged logical qubit 550 and Z-correcting the value of the logical qubit at the stopover 402 based on the results of the measurement.

Figure 5G:
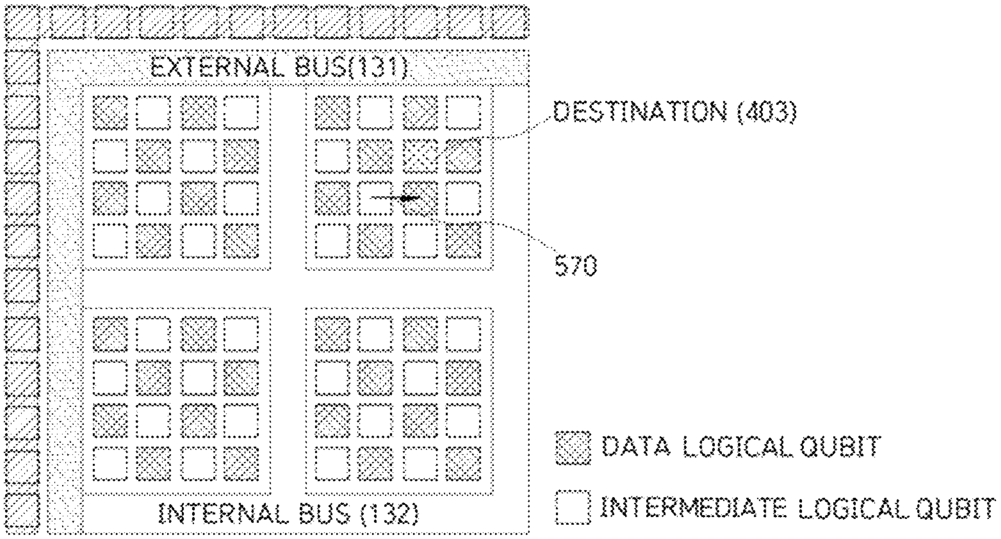

FIG. 5G is the last stage of the transverse movement. The temporary bus 540 is deleted by moving the data logical qubits that have been moved between the stopover 402 and the destination 403 to their original locations (570).

Next, an embodiment of a longitudinal movement of a magic qubit is described with reference to FIGS. 6 and 7A to 7G.

Figure 6:
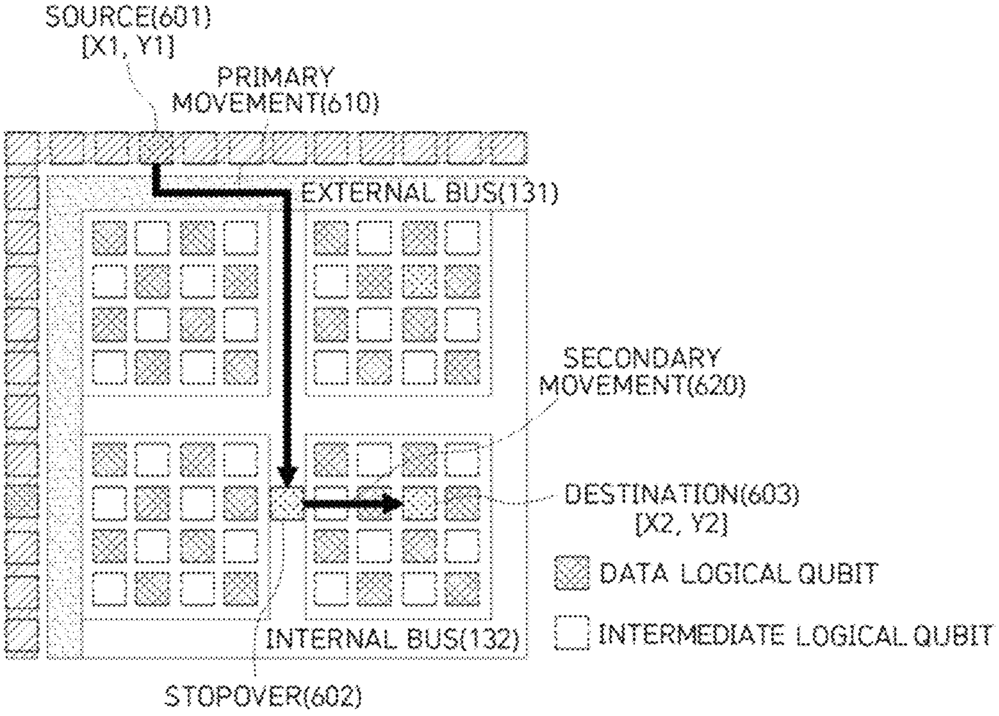
FIG. 6 is a diagram for describing a longitudinal movement of a magic qubit according to an embodiment of the present disclosure.
Figure 7A:
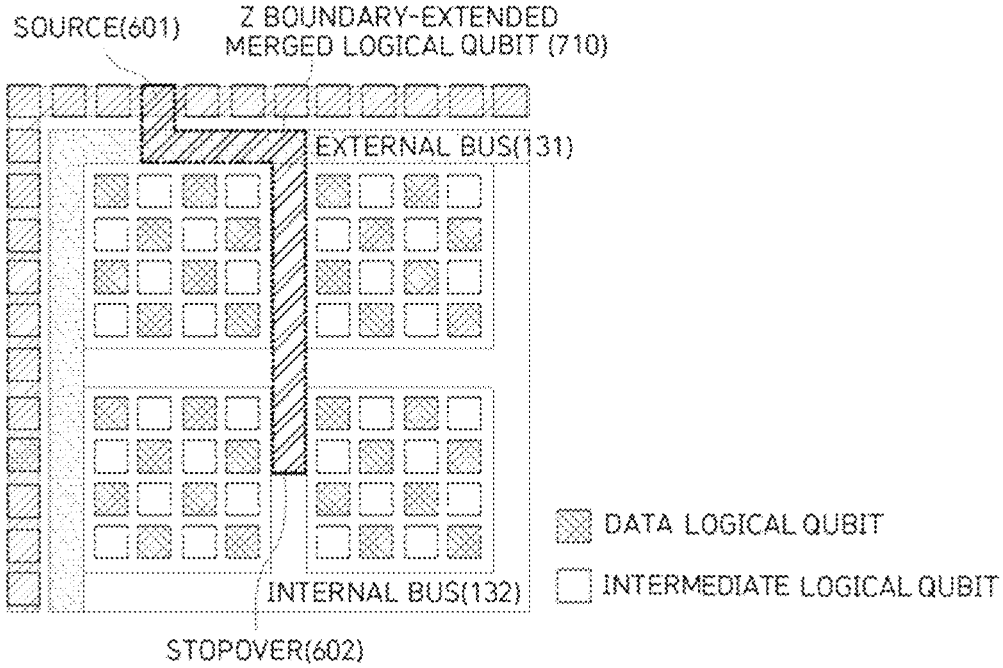
FIGS. 7A to 7G are diagrams for more specifically describing a longitudinal movement of a magic qubit according to an embodiment of the present disclosure.
Figure 7B:
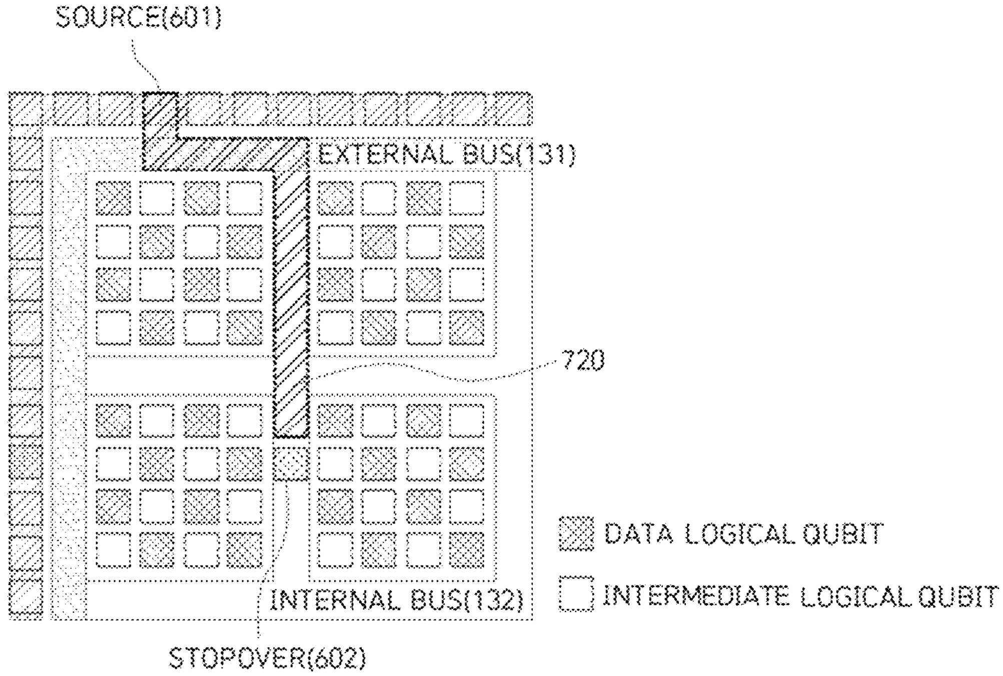

FIG. 6 is a diagram for describing a longitudinal movement of a magic qubit according to an embodiment of the present disclosure. FIGS. 7A to 7G are diagrams for more specifically describing a longitudinal movement of a magic qubit according to an embodiment of the present disclosure. In this case, FIGS. 7A and 7B illustrate a primary movement process, and FIGS. 7C to 7G illustrate a secondary movement process.

First, referring to FIG. 6, the internal bus 132 installed in the longitudinal direction and the temporary bus 133 installed in the transverse direction are used for the longitudinal movement of the magic qubit.

The longitudinal movement includes a primary movement 610 and a secondary movement 620. The primary movement 610 is to move a magic qubit at a source 601 to a stopover 602 disposed in an area adjacent to a logical qubit block through the internal bus 132 in the longitudinal direction. In this case, the stopover 602 is disposed within the internal bus 132 that is adjacent to the left or right of the logical qubit block to which a logical qubit at a destination 603 belongs.

Furthermore, the secondary movement 620 is to move the magic qubit at the stopover 602 to the destination 603 within the logical qubit block through the temporary bus 133 in the transverse direction.

More specifically, referring to FIG. 7A, a first Z boundary-extended merged logical qubit 710, including the source 601, the stopover 602, and the external bus 131 and the internal bus 132 between the source 601 and the stopover 602, is generated. The first Z boundary-extended merged logical qubit 710 has a form in which the boundary Z of the magic qubit at the source 601 has extended up to the stopover 602 by using the external bus 131 and the internal bus 132.

Such a process is performed by resetting qubits within the external bus 131 and the internal bus 132 between the source 601 and the stopover 602 and at the stopover 402 to |+> and performing error syndrome measurement on all of the first Z boundary-extended merged logical qubits 710. In this case, the first Z boundary-extended merged logical qubit 710 and the magic qubit at the source 601 have the same logical qubit state.

Referring to FIG. 7B, a logical qubit at the stopover 602 is split from the first Z boundary-extended merged logical qubit 720. Such a process is performed by measuring the remaining qubits except the logical qubit at the stopover 602 in the first Z boundary-extended merged logical qubit 710 and Z-correcting the value of the logical qubit at the stopover 602 based on the results of the measurement.

Figure 7C:
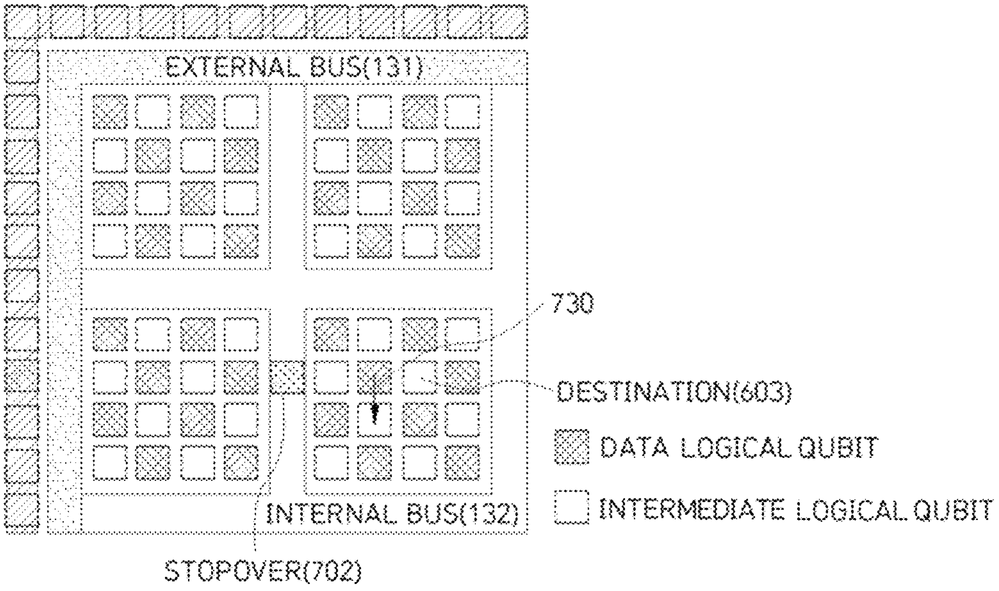

FIG. 7C is a process of generating the temporary bus 133. Data logical qubits between the stopover 602 and the destination 603 are moved to an adjacent intermediate logical qubit (730). Specifically, the process of generating the temporary bus 133 is performed by sequentially performing a process of performing X boundary merge on an intermediate qubit adjacent to a data logical qubit and a process of splitting logical qubits that have been merged into the boundary X again on the basis of the boundary X.

Figure 7D:
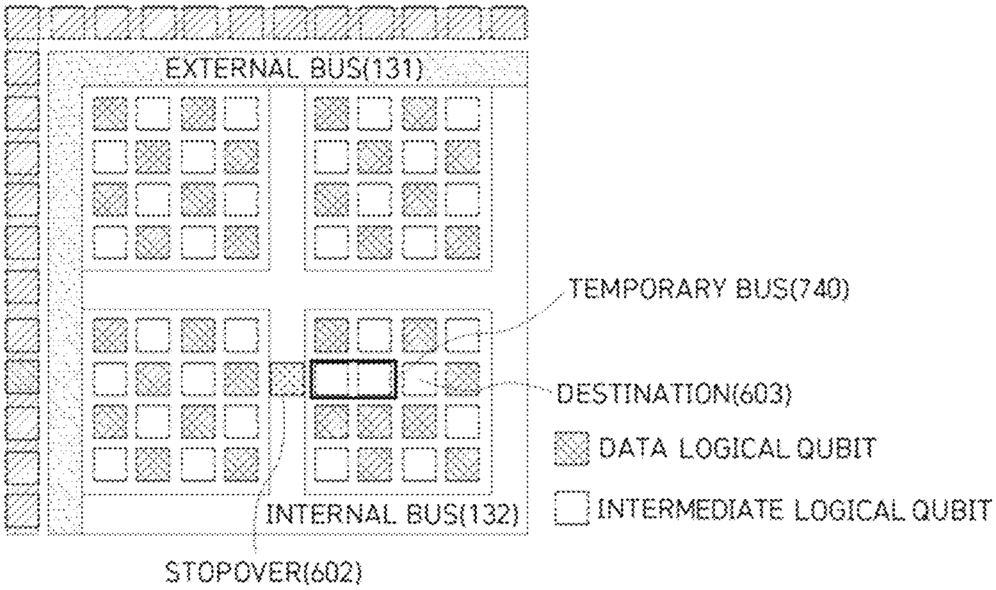

When the execution of the X merge and split processes is completed, as illustrated in FIG. 7D, only intermediate logical qubits are present between the stopover 602 and the destination 603. A temporary bus 740 based on the intermediate logical qubits is generated.

Figure 7E:
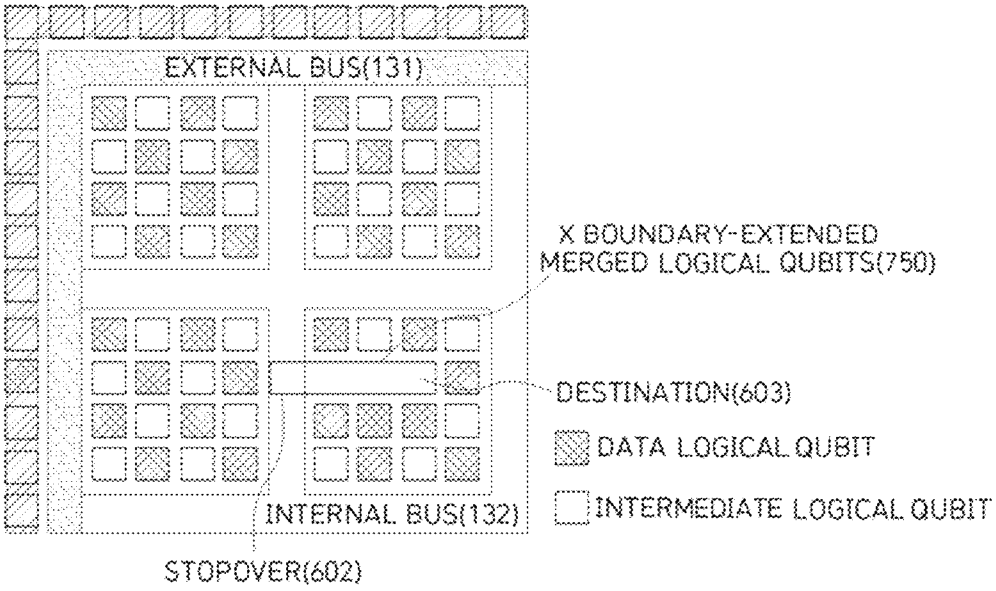

Referring to FIG. 7E, a second X boundary-extended merged logical qubit 750, including the stopover 602, the destination 603, and the temporary bus 740 between the stopover 602 and the destination 603, is generated. The second X boundary-extended merged logical qubit 750 has a form in which the boundary X of the stopover 602 has extended up to the destination 603 through the temporary bus 740.

Such a process is performed by resetting qubits within the temporary bus 740 and at the destination 603 to |0> and performing error syndrome measurement on all of the second X boundary-extended merged logical qubits 750. In this case, the second X boundary-extended merged logical qubit 750 and the magic qubit at the stopover 602 have the same logical qubit state.

Figure 7F:
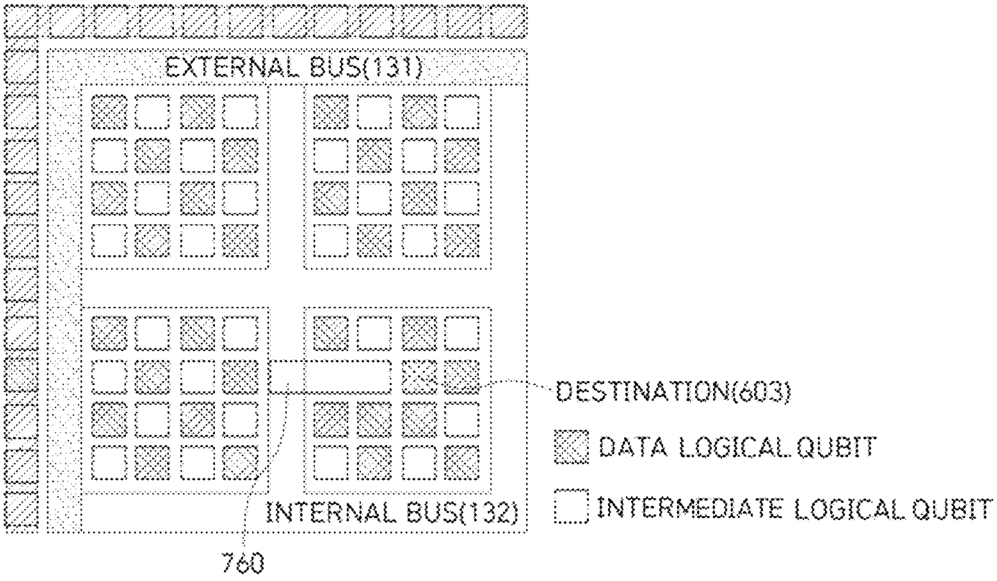

FIG. 7F is a process of splitting a logical qubit at the destination 603 from the second X boundary-extended merged logical qubit 750 (760). Such a process is performed by measuring the remaining qubits except the logical qubit at the destination 603 in the second X boundary-extended merged logical qubit 750 and X-correcting the value of the logical qubit at the stopover 602 based on the results of the measurement.

Figure 7G:
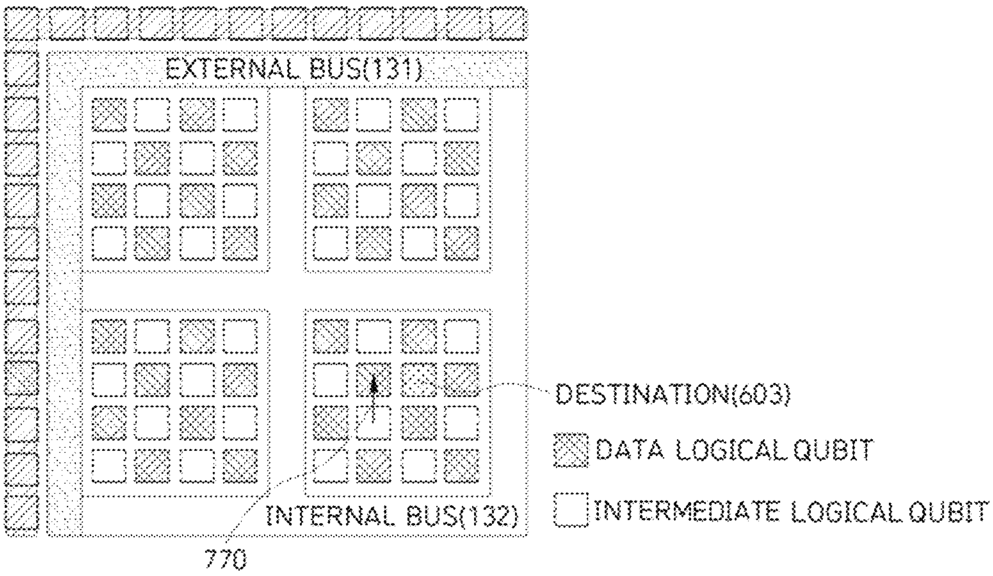

FIG. 7G is the last stage of the transverse movement. The temporary bus 740 is deleted by moving the data logical qubits that have been moved between the stopover 602 and the destination 603 to their original locations (770).

Hereinafter, a process of performing a general-purpose quantum operation between logical qubit blocks connected through the internal bus 132 is described with reference to FIGS. 8A to 11B.

In a general-purpose quantum operation for two logical qubits, the two logical qubits may be disposed at edges of two logical qubit blocks separated from each other by the internal bus 132. The general-purpose quantum operation for the two logical qubits is performed based on lattice surgery. The most basic operation includes a merge operation and a split operation. Accordingly, if a method of performing the merge and split operations on the two logical qubits separated from each other by the internal bus 132 is proposed, all of general-purpose 2-logical qubit quantum operations can be performed. In this case, the merge and split of the two logical qubits separated from each other by the internal bus 132 is basically performed by using the internal bus 132 as an intermediate logical qubit.

Figure 8A:
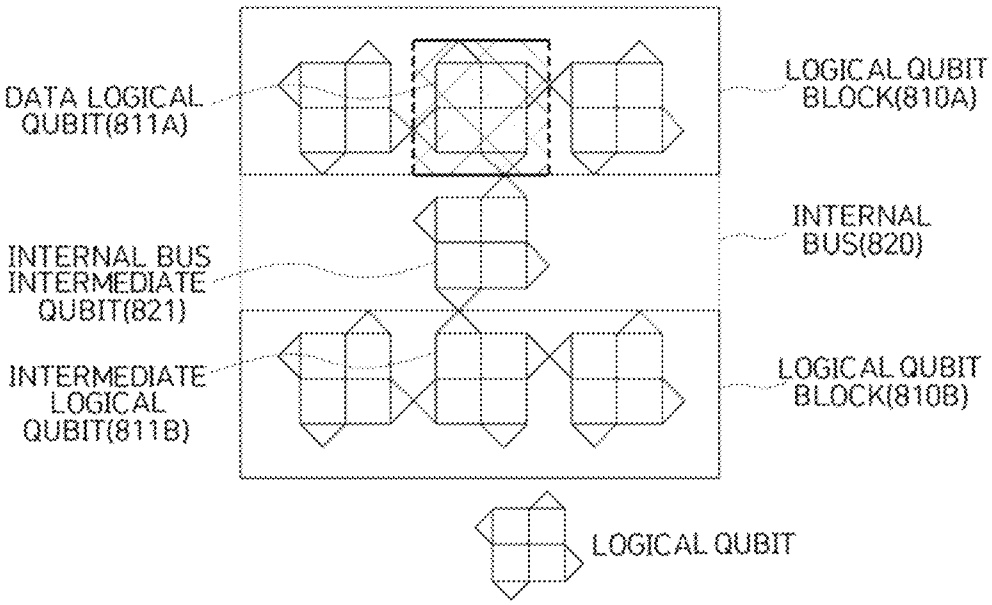
FIGS. 8A to 8C are diagrams for describing a merge command using an internal bus in a transverse direction in an embodiment of the present disclosure.
Figure 8B:
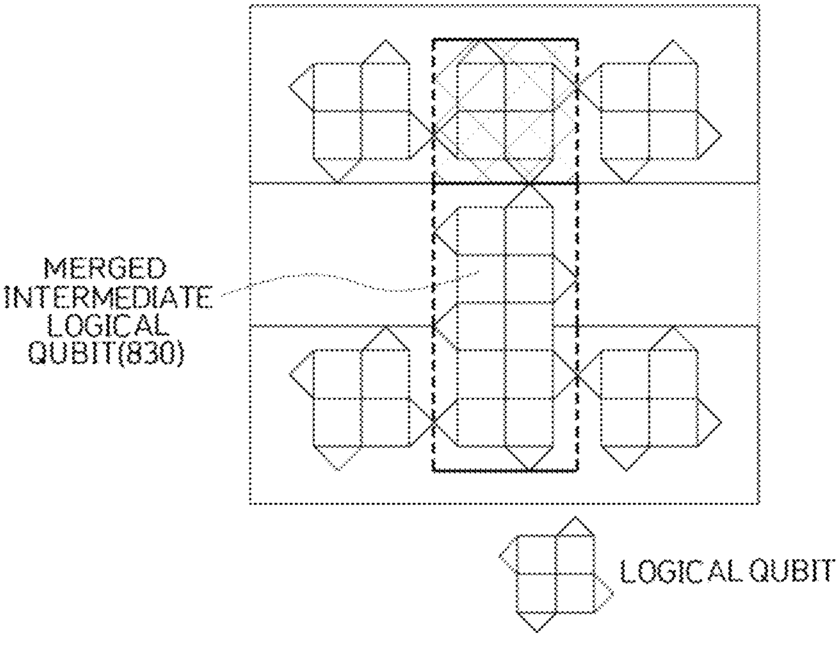
Figure 8C:
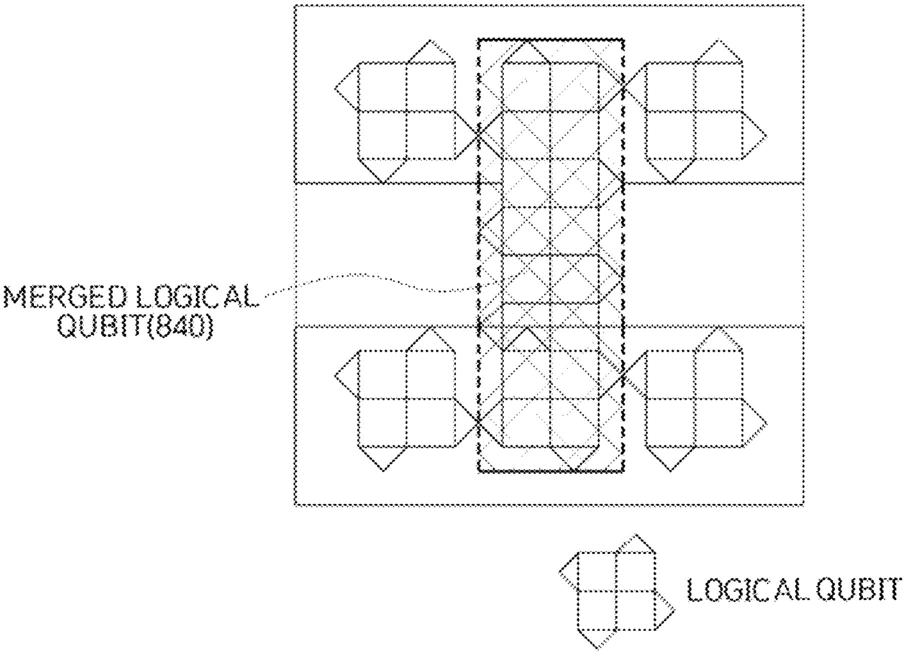

FIGS. 8A to 8C are diagrams for describing a merge command using the internal bus 132 in the transverse direction in an embodiment of the present disclosure.

First, FIG. 8A illustrates a data logical qubit 811*a* and an intermediate logical qubit 811*b* in logical qubit blocks 810*a* and 810*b*, respectively, and an intermediate qubit 821 within an internal bus 820.

Next, referring to FIG. 8B, a merged intermediate logical qubit 830 is generated by resetting the intermediate qubit 821 within the internal bus 820 between the logical qubits 811*a* and 811*b*, that is, general-purpose quantum operation targets, to |+> and performing X boundary merge on the intermediate qubit 821 within the internal bus 820 and the intermediate logical qubit 811*b*, among the general-purpose quantum operation targets 811*a* and 811*b*.

Next, referring to FIG. 8C, a merged logical qubit 840 is generated by performing X boundary merge on the merged intermediate logical qubit 830 and the data logical qubit 811*a*.

Figure 9A:
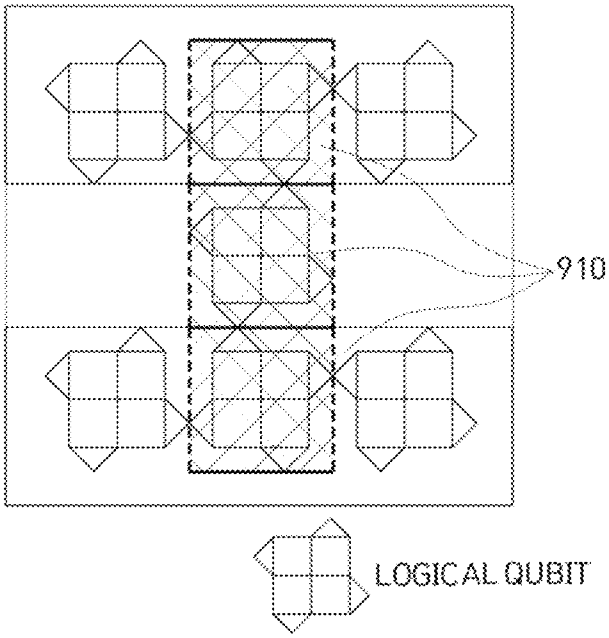
FIGS. 9A and 9B are diagrams for describing a split command using the internal bus in the transverse direction in an embodiment of the present disclosure.
Figure 9B:
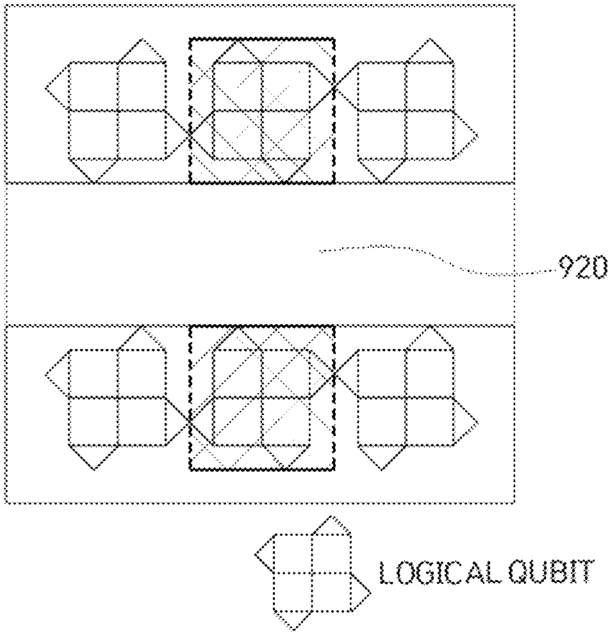

FIGS. 9A and 9B are diagrams for describing a split command using the internal bus 132 in the transverse direction in an embodiment of the present disclosure.

First, referring to FIG. 9A, a merged intermediate logical qubit is split into a data logical qubit, a logical qubit within the internal bus 132, and an intermediate logical qubit by performing an X boundary split on the merged intermediate logical qubit (910).

Next, referring to FIG. 9B, an intermediate qubit within the internal bus 132 is measured, and the state of the intermediate logical qubit is corrected based on the results of the measurement. Furthermore, when the split is terminated, the logical qubit within the internal bus 132 is deleted (920).

Figure 10A:
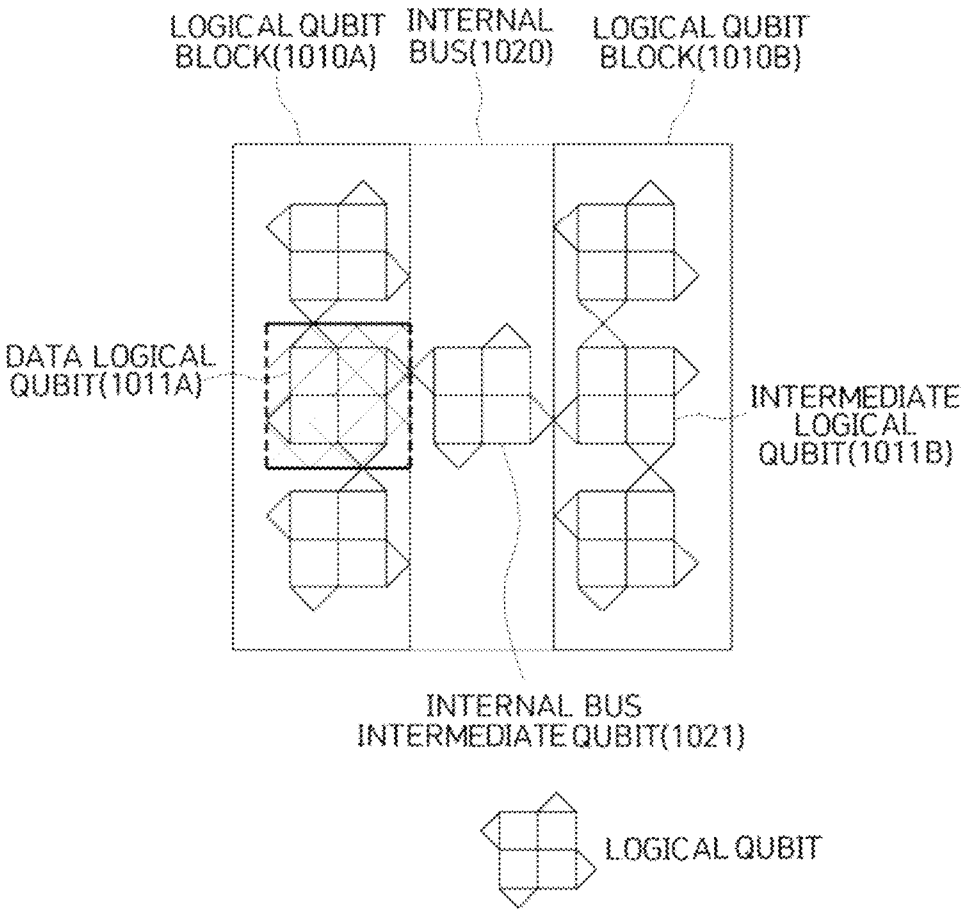
FIGS. 10A to 10C are diagrams for describing a merge command using the internal bus in a longitudinal direction in an embodiment of the present disclosure.
Figure 10B:
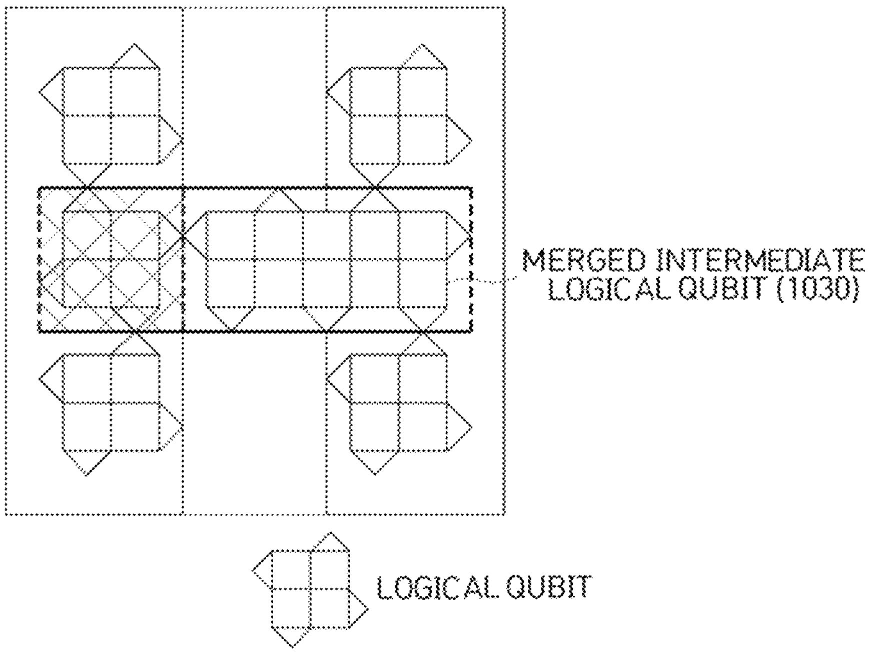
Figure 10C:
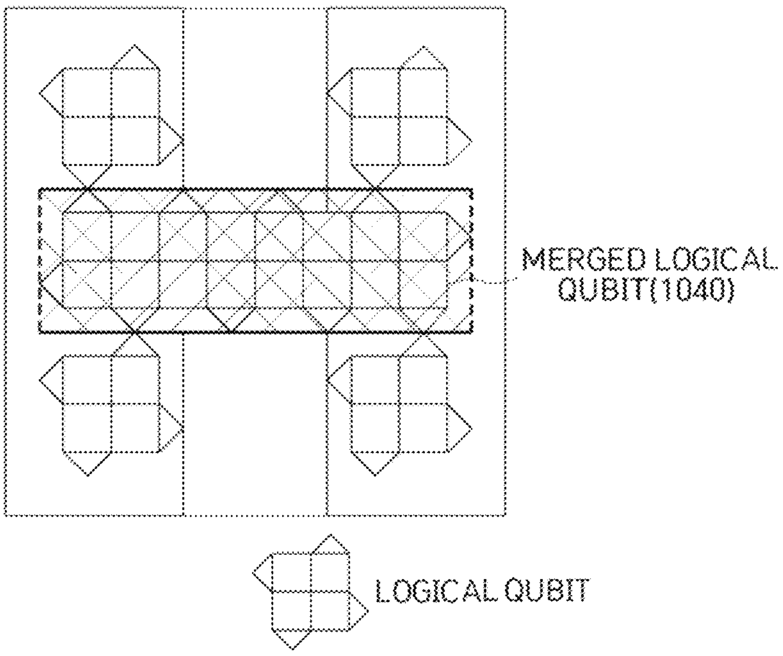

FIGS. 10A to 10C are diagrams for describing a merge command using an internal bus 1020 in the longitudinal direction in an embodiment of the present disclosure.

First, FIG. 10A illustrates a data logical qubit 1011*a* and an intermediate logical qubit 1011*b* within logical qubit blocks 1010*a* and 1010*b*, respectively, and an intermediate qubit 1021 within the internal bus 1020.

Next, referring to FIG. 10B, a merged intermediate logical qubit 1030 is generated by resetting the intermediate qubit 1021 within the internal bus 1020 between the logical qubits 1011*a* and 1011*b*, that is, general-purpose quantum operation targets, to |0> and performing Z boundary merge on the intermediate qubit 1021 within the internal bus 1020 and the intermediate logical qubit 1011*b*, among the general-purpose quantum operation targets 1011*a* and 1011*b*.

Next, referring to FIG. 10C, a merged logical qubit 1040 is generated by performing Z boundary merge on the merged intermediate logical qubit 1030 and the data logical qubit 1011*a*.

Figure 11A:
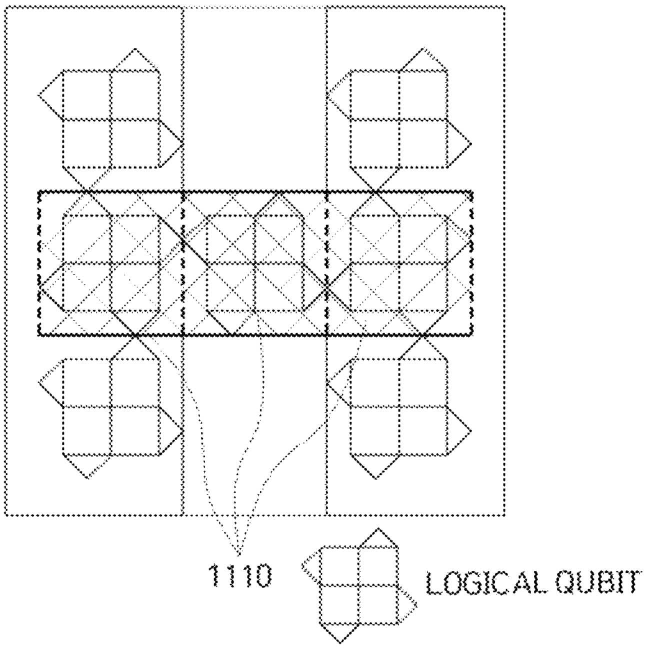
FIGS. 11A and 11B are diagrams for describing a split command using the internal bus in the longitudinal direction in an embodiment of the present disclosure.
Figure 11B:
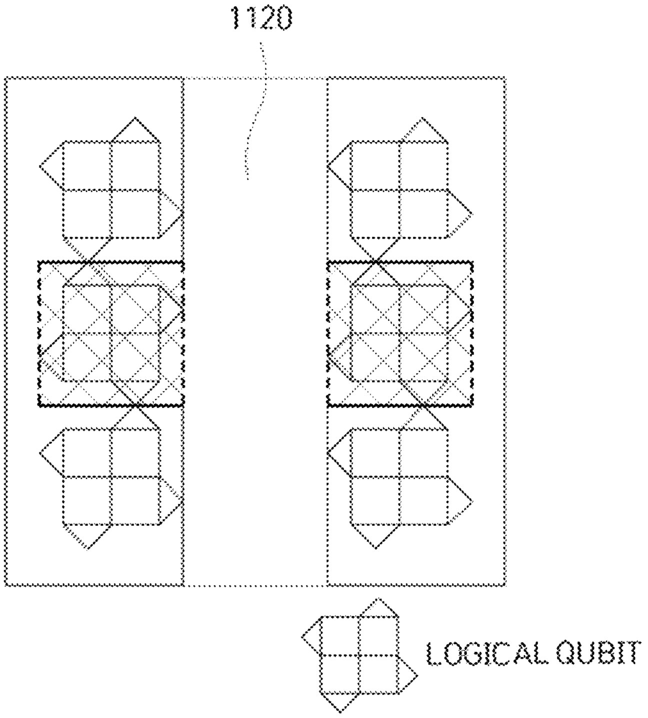

FIGS. 11A and 11B are diagrams for describing a split command using an internal bus 132 in the longitudinal direction in an embodiment of the present disclosure.

First, referring to FIG. 11A, a merged intermediate logical qubit is split into a data logical qubit, a logical qubit within the internal bus, and an intermediate logical qubit by performing a Z boundary split on the merged intermediate logical qubit (1110).

Next, referring to FIG. 11B, an intermediate qubit within the internal bus is measured, and the state of the intermediate logical qubit is corrected based on the results of the measurement. Furthermore, when the split is terminated, the logical qubit within the internal bus is deleted (1120).

In the aforementioned description, steps S310 to S350 may be further divided into additional steps or may be combined into smaller steps depending on an implementation example of the present disclosure. Furthermore, some of the steps may be omitted, if necessary, and the sequence of the steps may be changed. Furthermore, although contents are omitted, the contents of FIGS. 1 and 2 and the contents FIGS. 3 to 11A and 11B may be mutually applied.

The aforementioned embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, Python, or a machine language which is readable by a processor (CPU) of a computer through a device interface of the computer in order for the computer to read the program and execute the methods implemented as the program. Such a code may include a functional code related to a function, etc. That defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method of moving a magic qubit in logical qubit arrangement architecture based on a checkerboard, the method comprising:

generating a distilled magic qubit necessary for a predetermined logic operation through a magic state distiller;

storing the plurality of distilled magic qubits in a magic qubit repository;

primarily moving the stored magic qubit to an area adjacent to a logical qubit block corresponding to a destination through an external bus and an internal bus; and secondarily moving the magic qubit from the area adjacent to the logical qubit block to the destination within the logical qubit block through a temporary bus.

2. The method of claim 1, wherein:

the magic qubit repository is disposer in an outskirt area of the external bus, and the external bus is disposed in an outskirt area of the logical qubit block and the internal bus.

3. The method of claim 1, further comprising:

generating the temporary bus for the movement of the magic qubit to an inside of the logical qubit block; and deleting the temporary bus when the movement of the magic qubit is completed.

4. The method of claim 1, further comprising selecting a magic qubit at a source, which is to move to a predetermined destination within the logical qubit block, among the magic qubits stored in the magic qubit repository.

5. The method of claim 4, wherein the selecting of the magic qubit at the source comprises selecting a magic qubit having a shortest distance from the destination, among the magic qubits stored in the magic qubit repository, as the source.

6. The method of claim 4, wherein the primarily moving of the stored magic qubit to the area adjacent to the logical qubit block comprises:

transversely moving the magic qubit when the magic qubit repository corresponding to the selected magic qubit is disposed on a left or right of the logical qubit block, and longitudinally moving the magic qubit when the magic qubit repository corresponding to the selected magic qubit is disposed on an upper or lower side of the logical qubit block.

7. The method of claim 6, wherein the primarily moving of the stored magic qubit to the area adjacent to the logical qubit block comprises:

moving the magic qubit at the source to a stopover disposed in the area adjacent to the logical qubit block through the internal bus in a transverse direction upon transverse movement, and moving the magic qubit at the source to a stopover disposed in the area adjacent to the logical qubit block through the internal bus in a longitudinal direction upon longitudinal movement.

8. The method of claim 7, wherein the primarily moving of the stored magic qubit to the area adjacent to the logical qubit block comprises:

generating a first X or Z boundary-extended merged logical qubit comprising the source, the stopover, and the external bus and the internal bus between the source and the stopover; and splitting a logical qubit at the stopover from the first X or Z boundary-extended merged logical qubit.

9. The method of claim 8, wherein the generating of the first X or Z boundary-extended merged logical qubit comprises:

resetting qubits within the external bus and the internal bus between the source and the stopover and at the stopover; and generating the first X or Z boundary-extended merged logical qubit by extending a boundary X or boundary Z of the magic qubit at the source up to the stopover through the external bus and the internal bus.

10. The method of claim 7, wherein the secondarily moving of the magic qubit from the area adjacent to the logical qubit block to the destination within the logical qubit block through a temporary bus comprises:

moving a magic qubit at the stopover to the destination within the logical qubit block through the temporary bus in the longitudinal direction upon transverse movement, and moving the magic qubit at the stopover to the destination within the logical qubit block through the temporary bus in the transverse direction upon longitudinal movement.

11. The method of claim 10, wherein the secondarily moving of the magic qubit from the area adjacent to the logical qubit block to the destination within the logical qubit block through a temporary bus further comprises:

generating the temporary bus by moving data logical qubits between the stopover and the destination to an adjacent intermediate logical qubit;

generating a second Z or X boundary-extended merged logical qubit comprising the stopover, the destination, and the temporary bus between the stopover and the destination;

splitting a logical qubit at the destination from the second Z or X boundary-extended merged logical qubit; and deleting the temporary bus by moving the moved data logical qubits between the stopover and the destination to their original locations.

12. The method of claim 11, wherein the generating of the temporary bus by moving the data logical qubits between the stopover and the destination to the adjacent intermediate logical qubit comprises:

performing Z boundary merge or Z boundary merge on the data logical qubit and the adjacent intermediate logical qubit; and generating the temporary bus based on the intermediate logical qubit by splitting the logical qubits merged into a boundary Z or a boundary X based on the boundary Z or the boundary X.

13. The method of claim 11, wherein the generating of the second Z or X boundary-extended merged logical qubit comprises:

resetting qubits within the temporary bus and the destination; and generating the second Z or X boundary-extended merged logical qubit by extending a boundary Z or boundary X of the stopover up to the destination through the temporary bus.

14. The method of claim 1, further comprising performing a general-purpose quantum operation comprising at least one of a merge command and a split command between logical qubits that are adjacent to each other in each of logical qubit blocks that are connected through the internal bus.

15. The method of claim 14, wherein the performing of the general-purpose quantum operation comprises:

resetting an intermediate qubit within the internal bus between the logical qubits that are the general-purpose quantum operation targets;

generating a merged intermediate logical qubit by performing X boundary merge or Z boundary merge on an intermediate logical qubit, among the intermediate qubit within the internal bus and the general-purpose quantum operation targets; and generating a merged logical qubit by performing X boundary or Z boundary merge on a data logical qubit, among the merged intermediate logical qubit and the general-purpose quantum operation targets.

16. The method of claim 15, wherein the performing of the general-purpose quantum operation comprises:

splitting the merged logical qubit into a data logical qubit, a logical qubit within the internal bus, and an intermediate logical qubit by performing an X boundary split or a Z boundary split on the merged logical qubit; and deleting the logical qubit within the internal bus.

17. Logical qubit arrangement architecture based on a checkerboard, comprising:

a magic state distiller configured to generate a distilled magic qubit necessary for a predetermined logic operation;

a magic qubit repository configured to store the plurality of distilled magic qubits; and a bus unit comprising an external bus for moving a magic qubit stored in the magic qubit repository, an internal bus for moving the magic qubit from the external bus to an area adjacent to a logical qubit block, and a temporary bus for moving the magic qubit from the internal bus to an inside of the logical qubit block.

* * * * *